United States Patent [19]

Sain

[11] 4,038,929
[45] Aug. 2, 1977

[54] PORTABLE MEAT RAILER SHIPPING ASSEMBLY

[75] Inventor: Bernard S. Sain, Houston, Tex.

[73] Assignee: Sea-Land Service, Inc., Elizabeth, N.J.

[21] Appl. No.: 615,605

[22] Filed: Sept. 22, 1975

[51] Int. Cl.$^2$ .......................... A47F 5/01; A47F 7/00; B61D 3/16; B61D 45/00
[52] U.S. Cl. ................................ 105/367; 105/499; 211/113; 211/182; 214/38 D
[58] Field of Search ............ 104/97; 105/366 R, 367, 105/371, 463, 464, 465, 496, 497, 503, 499; 108/59; 211/113, 182, 189, 191, 193, 206; 214/38 D; 220/1.5, 18; 280/179 A, 179 B, 179 R; 296/3

[56] References Cited

U.S. PATENT DOCUMENTS

| 1,021,122 | 3/1912 | Willoughby | 108/59 |
| 1,294,457 | 2/1919 | Hawk | 105/367 |
| 1,856,472 | 5/1932 | Dentler | 105/367 |
| 2,546,929 | 3/1951 | Nampa | 105/503 |
| 2,590,533 | 3/1952 | Hamer | 211/113 |
| 2,919,661 | 1/1960 | Caputo et al. | 105/366 R |

Primary Examiner—Robert J. Spar
Assistant Examiner—Howard Beltran

[57] ABSTRACT

A demountable portable meat railer for a refrigerated cargo container having a series of inverted U-shaped sections supported vertically in the container with a series of removable laterally-spaced carcass-supporting rails with means to limit lateral displacement.

5 Claims, 5 Drawing Figures

U.S. Patent  Aug. 2, 1977  4,038,929
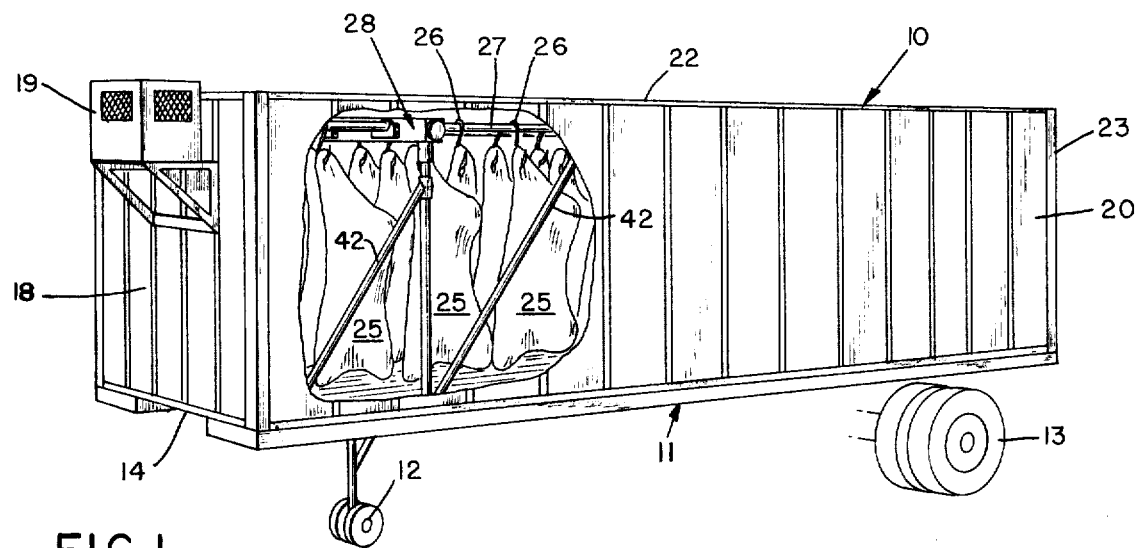
FIG.1
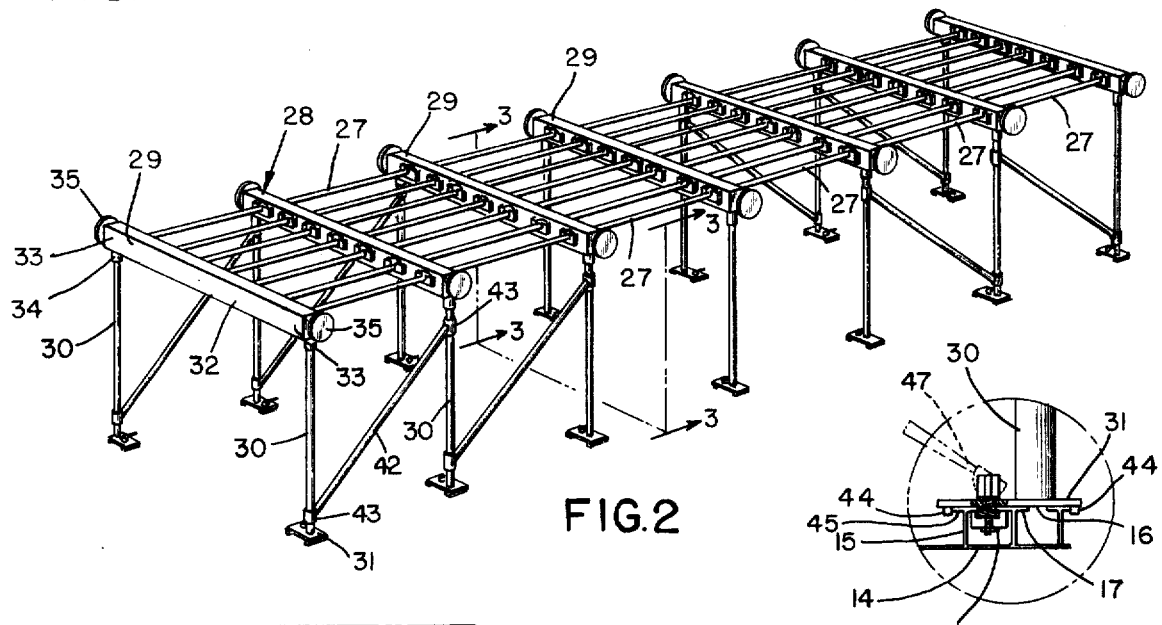
FIG.2
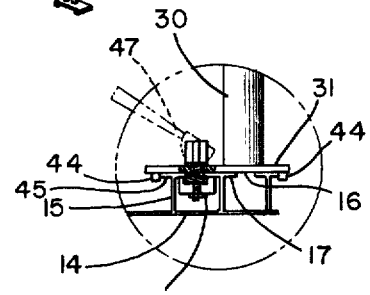
FIG.4
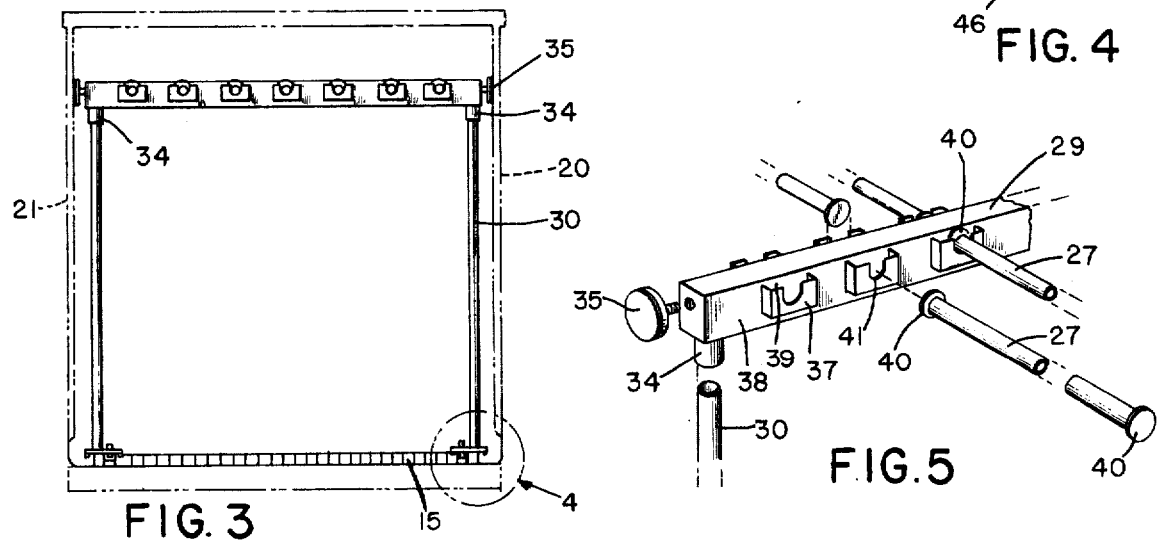
FIG.3
FIG.5

PORTABLE MEAT RAILER SHIPPING ASSEMBLY

BACKGROUND, OBJECTIVES AND ADVANTAGES OF THE INVENTION

The shipment of various types of cargo in unitized containers over the road and aboard ship has become conventional within the past fifteen years. The individual containers that are mounted on a wheeled chassis for land transportation are demountable from the wheeled chassis for storage and shipment in stacked relationship onboard ship to a final destination. Individual refrigerator units having sufficient capacity to maintain the temperature level in an individual container is also well known and has been used widely to refrigerate perishable products such as produce, meats and other products.

There has been developed a substantial market in various countries for the trans-shipment for meat products in carcass form. The utilization of a cargo container has been found suitable for shipping meat carcasses in a refrigerated unit. However, the fixtures and hardware necessary to equip a cargo container fully with a permanent installation requires that the installation be costly and the individual container may be returned after shipment of a load of meat carcasses empty on the return trip thereby requiring an increased cost of the initial shipment or requiring the shipper to absorb the cost of the empty return for the cargo container.

Present invention is directed to a demountable or knock-down portable meat railer for supporting meat carcasses in a containerized housing for storage and shipment in one direction with a full load of carcasses supported in the refrigerated containerized unit and after delivery, the demountable portable meat railer may be readily and easily disassembled, stacked and stored in a minimum space enabling an entirely different cargo to be loaded in the containerized unit for the return trip thereby reducing cost of the shipped cargo.

It is an objective of this invention to provide a knock-down portable meat railer for use in combination with a containerized shipping unit which may be readily erected by unskilled labor, loaded with meat carcasses, shipped to any destination in a refrigerated unit, and the meat railer disassembled by unskilled labor, stacked and stored when a different cargo load may be shipped in the same containerized unit.

Another objective of this invention is the provision of a knock-down or demountable portable meat railer in which a series of inverted U-shaped sections, each of which is readily disassembled, and a series of carcass supporting rails are assembled to form a meat railer within a containerized unit for shipment of a cargo of meat carcasses in a refrigerated cargo container between distant locations and the meat railer may be readily disassembled within the containerized unit for accommodating other cargo.

Still another objective of this invention is the provision of a knock-down and portable meat railer for a cargo container that will support meat carcasses in a refrigerated atmosphere and in which the meat railer may be readily disassembled for thorough cleansing and reinstallation after the containerized unit is thoroughly cleaned to meet appropriate governmental standards.

Other objectives and many of the attendant advantages of this invention will become more readily apparent to those skilled in the transportation of meat products from a detailed description of the invention taken in conjunction with the accompanying drawing in which like characters of reference designate corresponding parts throughout the several views.

DESCRIPTION OF THE DRAWING

FIG. 1 is a perspective view of a cargo containerized refrigerated unit mounted on a wheeled chassis in which the container is removable from the wheeled chassis showing a portion of the side wall removed illustrating suspended meat carcasses on the meat railer;

FIG. 2 is a perspective view of the demountable, portable meat railer shown in assembled condition outside of the containerized unit;

FIG. 3 is an enlarged transverse sectional view taken substantially along the plane of section line 3—3 of FIG. 2 but including, in outline form, the surrounding containerized unit with the individual section shown secured to the base or floor rails of the container;

FIG. 4 is an enlarged detail of the connection of the lower end of a stanchion with the container for flanges or rails; and FIG. 5 is a partial perspective and exploded view of portions of the meat railer illustrating the disassembly or assembly of the various elements.

DETAILED DESCRIPTION OF ONE PREFERRED EMBODIMENT OF THE INVENTION

Referring to the drawing and particularly to FIG. 1, there is illustrated a containerized unit 10 of conventional construction having a wheeled frame for chassis 11 in the supported condition by the retractable casters 12 and the road wheels 13 from which chassis 11 the container ten is removed when placed aboard a vessel for trans-shipment overseas.

The containerized unit 10 may be of conventional construction in which there is a floor 14, the interior of which is provided with longitudinally-extending and spaced-apart flanged tracks 15 suitable secured to the base of the floor and provided with an opening 16 between adjacent webs 17 forming the elevated floor at the base of the container as more clearly shown in FIG. 4. The front wall 18 of the container is provided with a conventional refrigeration unit 19 securely mounted at the upper part of the wall 18 which may be provided with its own power source or which may be connected to a power source onboard ship in order to supply adequate refrigeration for the contained cargo in the unit 10. The side walls 20 and 21, the roof 22 and rear wall 23 with closure doors (not shown) are of conventional construction. Meat carcasses 25 are shown in FIG. 1 suspended from conventional meat hooks 26 that depend from the horizontal meat supporting rails 27 forming one of the components of the demountable and knock-down portable meat railer 28 that is mounted within the container unit 10.

There is illustrated in FIG. 2 the knock-down and portable meat railer assembled outside of a container 10 showing a series of inverted U-shaped sections 29 forming the verticle supporting members of the meat railer in which each inverted U-shaped section 29 is provided with a pair of vertical stanchions 30 with the lower end having thereto a floor rail engaging flange 31 and a lintel member 32 that may be square or rectangular in cross-section. Adjacent to the terminal ends 33 of the lintel 32, and facing downwardly, in spaced relation, is a pair of stanchion-receiving sleeves 34 into which the upper end 35 of a stanchion 30 will be received and supported. Also, at the terminal ends 33 of the lintel, there is a wall-engaging bumper 35 that is threadably secured to each end of the lintel and preferably a resilient or rubber surface is secured thereto for the purpose of adjusting the length of the lintel so that the bumpers 35 will engage the inside of the side walls 20 and 21 to prevent lateral displacement of the lintel and meat railer as shown in FIG. 3.

A series of laterally-spaced rail-supporting sockets 37 is securely fastened by welding to one or both vertical sides 38 of the lintel 29, depending upon whether the lintel is in an end lintel or an intermediate, with each socket 37 being provided with an enlarged opening 39 for receiving the flanged end 40 secured to each end of a meat supporting rail 27. As shown in FIG. 5, the flange 40 on the meat rail 27 fits into the enlarged portion of the socket 37 and the rail 27 is supported in the arcuate seat 41 of the socket 37. The individual rails may be readily inserted and removed from their respective sockets by downward or upward force as the case may be for mounting or demounting the meat railer.

A series of cross-bracing members 42 may be utilized if desirable by positioning and securing a stanchion and circling sleeve member 43 at each end of the cross-bracing member 42 which will extend from the lower end of one stanchion to the upper end of the next adjacent stanchion 30 as shown in FIGS. 1 and 2. It is desirable to weld or otherwise securely fasten the sleeves 43 at the desired angle or to provide a clevis joint to facilitate mounting and demounting.

Installation of the vertical stanchions 30 is facilitated through the use of flange 31 at the bottom of which depend lugs 44 which are designated to straddle three of the webs 45 of the upstanding rails 15 in the base of the floor 14. A fastening nut 46 bridges between adjacent webs beneath the flange 31 and and is held in a locked position by means of the double cam and swing bolt 47 enabling quick release or locking action for installation or removal of the flange in connection with the floor rails. It will be readily apparent that other fastening means may be utilized to connect the stanchion flange 31 to the rails including a threaded connection as opposed to a conventional double cam and swing bolt of the type made by Universal Engineering as catalogued number 70038 and 70015.

In operation, the vertical stanchion members 30 may be erected in position along both sides of the container 10. Thereafter, the cross brace members 42 may be positioned at selected locations or throughout both sides as shown in FIG. 2 for the proper spacing before mounting the lintels 32 in position on the upper ends of the stanchion 30 to the sleeve connections 34. The bumpers 35 are adjusted outwardly to prevent lateral swaying against the interior walls 20 and 21 of the unit 10. The individual meat supporting rails may then be positioned to reach from one lintel to another before introducing and hanging the meat carcasses from one end to the other. An individual may move readily from one end of the unit to the other with relative ease of access during the loading and unloading operations.

After the meat carcasses have been delivered to their ultimate destination, the meat railer may be readily disassembled element by element or the entire assembly may be removed in the assembled condition. It will be readily apparent that for some cargo transportation, a load may be introduced into the containerized unit while the meat railer is in position thereby obviating the necessity for disassembly but this would depend upon the nature and character of the load that is being transported.

It has been found desirable to make the various members including the lintels, stanchions, flanges, cross-braces, saddles and bumpers of a non-corrosive material such as aluminum or stainless steel with the ends of the bumpers being made of rubber or suitable material. However, it will be readily apparent that other materials may be used which would not be deleterious to the load being transported when subjected to varying atmospheres aboard ship and exposed to the meat carcasses being transported that may be treated in various ways.

I claim:

1. A demountable and portable meat railer for an enclosed refrigerated cargo container having a base with floor mounted flanged rails, side and end walls and a top, said meat railer comprising a plurality of inverted U-shaped sections releasably supported in spaced relation to each other on said floor mounted flanged rails in the container, means for retaining said sections in an upright position, a plurality of meat supporting rails detachably connected and extending between said sections each section having a horizontal portion and pair of laterally-spaced vertical stanchions, each stanchion having a bottom and a top end, a flange mounted on the stanchion's bottom end for releasably engaging said floor mounted flange rails, and means on each stanchion for releasably engaging said top ends of the stanchion with said horizontal portion.

2. A demountable and portable meat railer as claimed in claim 1, said inverted U-shaped sections each having a lintel and spaced-apart sleeves mounted thereon, a pair of laterally spaced vertical stanchions in each of said inverted U-shaped sections with each section having a lintel and a pair of laterally spaced vertical stanchions, each of said stanchions being cooperatively received in said sleeves in said lintel for releasable engagement therewith.

3. A demountable and portable meat railer as claimed in claim 1, and a lintel forming a horizontal portion of said inverted U-shaped section and having laterally spaced meat rail supporting sockets, said sockets having a flange-receiving pocket and a rail seat, said meat supporting rails having enlarged flanged ends for cooperative engagement in said pocket of said meat rail supporting sockets for supporting said meat rail in said meat rail supporting sockets.

4. A demountable and portable meat railer as claimed in claim 1, a lintel forming a portion of each inverted U-shaped section, and means on said lintel for engaging the side walls of said container to limit lateral displacement of each of said inverted U-shaped sections.

5. A demountable and portable meat railer as claimed in claim 1, and detachable bracing means extending between adjacent stanchions.

* * * * *